United States Patent [19]

Jeong et al.

[11] Patent Number: 5,166,896
[45] Date of Patent: Nov. 24, 1992

[54] DISCRETE COSINE TRANSFORM CHIP USING NEURAL NETWORK CONCEPTS FOR CALCULATING VALUES OF A DISCRETE COSINE TRANSFORM FUNCTION

[75] Inventors: Ho-Sun Jeong; Je-kwang Ryu, both of Taegu, Rep. of Korea

[73] Assignee: Samsung Electronics Co., Ltd., Kyunggi-do, Rep. of Korea

[21] Appl. No.: 659,089

[22] Filed: Feb. 22, 1991

[30] Foreign Application Priority Data

Apr. 3, 1990 [KR] Rep. of Korea .................. 90-4513

[51] Int. Cl.$^5$ ............................................. G06F 7/38
[52] U.S. Cl. ...................................................... 364/725
[58] Field of Search ............... 364/725, 748, 768, 754; 395/21

[56] References Cited

U.S. PATENT DOCUMENTS 4,829,465  5/1989  Knauer et al. ..................... 364/725
4,831,574  5/1989  Duhamel ............................ 364/725

OTHER PUBLICATIONS

Azriel Rosenfield et al. Digital Picture Processing, Second Edition, vol. 1, 1982, pp. 150-161.
Hong-rak Kim, Implementation of CMOS Adder and Subtracter Based on Neural Networks, Dept. of Electronic Engineering, College of Engineering, Kyungpook National University, Aug. 1989, pp. 152-165.
Jong-oh Parket et al, A Simple Discrete Cosine Transform Systolic Array Based on DFT for Video Code C, Nov. 1989, Korea.

Primary Examiner—Long T. Nguyen
Attorney, Agent, or Firm—Cushman, Darby & Cushman

[57] ABSTRACT

A discrete cosine transform chip includes circuits using neural network concepts that have parallel processing capability as well as conventional digital logic circuits. In particular, the discrete cosine transform chip includes a cosine term processing portion, a multiplier, an adder, a subtractor, and two groups of latches. The multiplier, the adder and the subtractor incorporated in the discrete cosine transform chip use unidirectional feed back neural network models.

12 Claims, 6 Drawing Sheets

DISCRETE COSINE TRANSFORM CHIP USING NEURAL NETWORK CONCEPTS FOR CALCULATING VALUES OF A DISCRETE COSINE TRANSFORM FUNCTION

FIELD OF THE INVENTION

The present invention relates to a discrete cosine transform chip which is designed using neural network concepts with parallel processing capability, for applications which require data and time intensive discrete cosine transforms.

BACKGROUND OF THE INVENTION

Generally, discrete cosine transforms have been most widely used in image and digital speech processing where a good transform performance, as disclosed in *Digital Picture Processing, Second Edition, Volume 1*, pp. 159–168, by Azriel Rosenfeld and Avinash C. Kak, 1982, is required. However, the transform must process a large quantity of data and, therefore, is time consuming.

In order to solve the problem, many kinds of fast algorithms for discrete cosine transforms have been developed, such as, "A Simple Discrete Cosine Transform Systolic Array based on DFT for Video Code c", by Jong-oh Park, Kwang-jae Lee, Guen-ho Yang, Juyong Park and Moon-ho Lee, on Nov. 1989 in Korea. However, in the digital image processing field, fast algorithms have short-comings in that real-time applications or hardware implementations of the algorithms are very complicated.

SUMMARY OF THE INVENTION

It is an object of the present invention to provide a high speed discrete cosine transform chip which includes a cosine term processing portion and a second processing portion.

In an embodiment of the present invention an N-point discrete cosine transform chip implements the discrete cosine transform function, $$F(k) = \frac{2c(k)}{N} \sum_{n=0}^{N-1} f(n)\cos[(2n + 1)k\pi/2N],$$

where $c(k) = 2^{-\frac{1}{2}}$ for $k = 0$ and $c(k) = 1$ for $k = 1, 2, \ldots, N-1$.

The discrete cosine transform chip according to the present invention includes a cosine term processing portion for processing the cosine terms included in the above discrete cosine transform function. The discrete cosine transform chip also includes a multiplier for multiplying the output of the cosine term processing portion with an input f(n). Also included is an adder for adding the output from the multiplier to a value stored in a group of latches, referred hereinafter as a first latch portion. The first latch portion is reset by a clock signal, referred hereinafter as a second clock signal, and stores the signal input from the adder in accordance with another clock signal, referred hereinafter as a first clock signal.

The discrete cosine transform chip also includes a subtractor for subtracting a predetermined binary value from the stored value supplied from the first latch portion. This operation is equivalent to dividing the stored value by N/2. Another group of latches, referred hereinafter as the second latch portion and connected to the output terminal of the discrete cosine transform chip, maintains the value of the chip's output by storing the signal input from the first latch portion and the subtractor in accordance with the second clock signal. The second latch portion will be reset when an underflow signal is generated by the subtractor.

The object and features of the present invention will become more readily apparent from reading the following detailed description with references to the drawings.

DESCRIPTION OF THE PREFERRED EMBODIMENT OF THE INVENTION

The algorithm on which the present invention is based will now be explained.

The general equations of a discrete cosine transform function (DCT function) and an inverse discrete cosine transform function (IDCT function) can be represented as follows:

$$DCT: F(k) = \frac{2c(k)}{N} \sum_{n=0}^{N-1} f(n)\cos[(2n + 1)k\pi/2N] \quad (1)$$

$$IDCT: f(n) = c(k) \sum_{n=0}^{N-1} F(k)\cos[(2n + 1)k\pi/2N]$$

where $c(k) = 2^{-\frac{1}{2}}$ for $k = 0$ and $c(k) = 1$ for $k = 1, 2, \ldots, N-1$.

The above DCT and IDCT functions are one-dimensional. However, the functions are also useful for computing two-dimensional DCTs and IDCTs. A two-dimensional DCT can be obtained by repeatedly performing a one-dimensional DCT, because the two-dimensional DCT function can be separated into two one-dimensional DCT functions.

The fundamental function for a two-dimensional discrete cosine transform can be represented as follows.

$$F(u,v) = \frac{4c(u,v)}{N^2} \sum_{m=0}^{N-1} \sum_{n=0}^{N-1} f(m,n)\cos[(2n + 1)u\pi/2N] \cdot \cos[(2n + 1)v\pi/2N]$$

where $c(u,v) = \frac{1}{2}$ for $u = v = 0$ and $c(u,v) = 1$ for $u, v = 1, 2, \ldots, N-1$.

The present invention implements a one-dimensional DCT function in hardware by setting N, the element number, to 256. The equation (1) above can be rewritten as follows when the element number N is set to 256 and when the c(k) term is ignored:

$$F(k) = \frac{1}{128} \sum_{n=0}^{255} f(n)\cos[(2n + 1)k\pi/512] \qquad (2)$$

where k=0, 1, ..., 255. The algorithm used for computing a discrete cosine transform in the present invention is based on equation (2).

Figure 1:
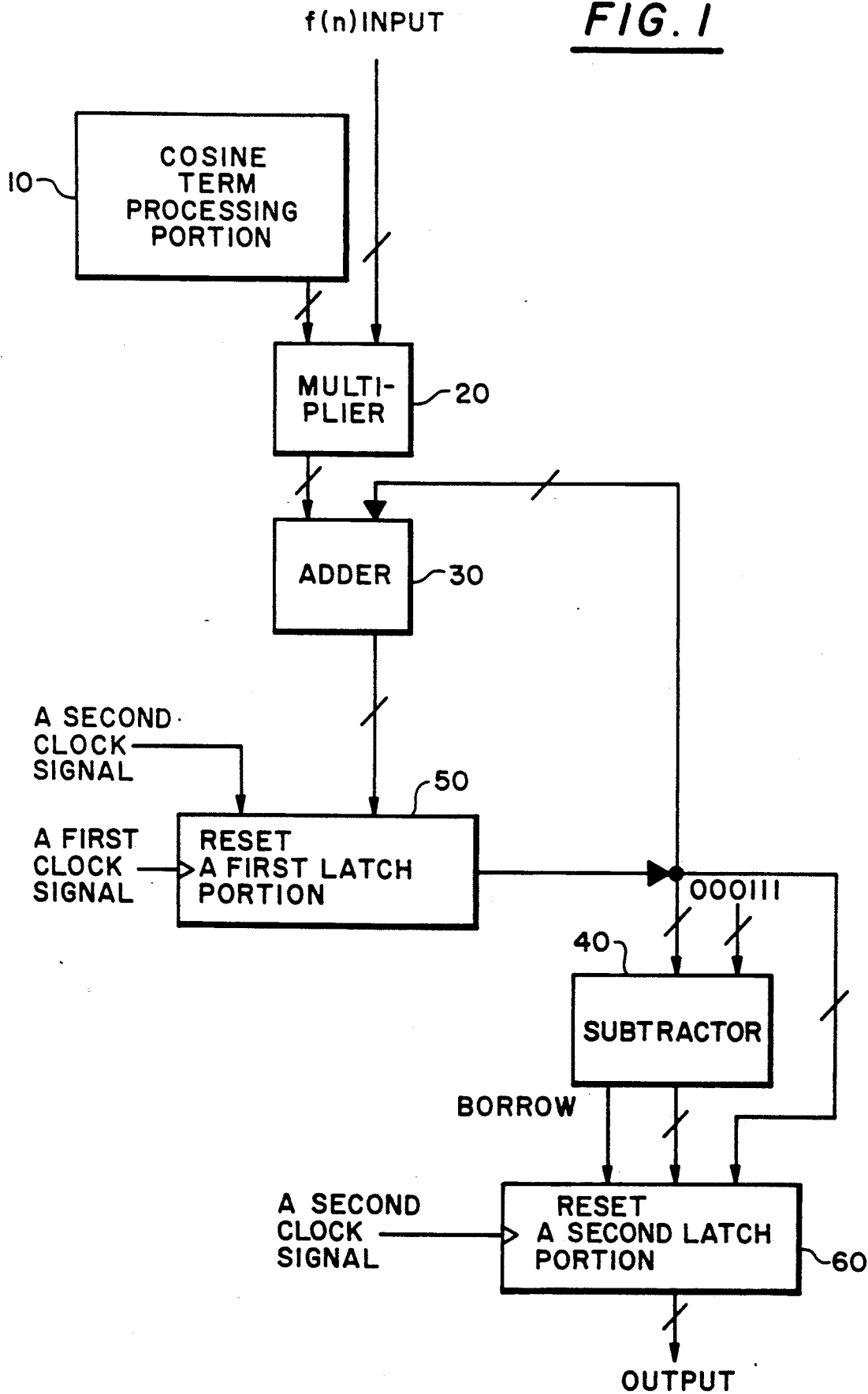
FIG. 1 shows a block diagram of one embodiment of a discrete cosine transform chip according to the present invention.

FIG. 1 shows a block diagram of one embodiment of a discrete cosine transform chip according to the present invention. As shown in FIG. 1, the present invention implements equation (2) in hardware which comprise a cosine term processing portion 10 and a second processing portion. The cosine term processing portion 10 processes the value of $\cos[(2n+1)k\pi/512]$ in the equation (2). The second processing portion includes: a multiplier 20 which multiplies the output of the cosine term processing portion 10 and the input f(n); an adder 30 which adds the output of multiplier 20 and the output of a first latch portion 50; a first latch portion 50 which is reset according to the second clock signal and which stores the signal input from adder 30 according to the first clock signal; a subtractor 40 which subtracts 0000111 from a 7-bit exponent in order to divide the output of first latch portion 50 by 128, as in equation (2); and a second latch portion 60 which is reset when an underflow is generated. Second latch portion 60 maintains the value of the output by storing the signal input from subtractor 40 and first latch portion 50 in accordance with the second clock signal. All inputs and outputs that are shown in FIG. 1 are 32-bit floating point values. In addition, clock signals are provided by the first clock signal CLKI and the second clock signal CLK2.

Second latch portion 60 detects an underflow at subtractor 40 by a borrow signal from the borrow terminal of subtractor 40, and is reset to 0 depending on state of the borrow signal feeding into the reset terminal of second latch portion 60. An underflow signal is generated by subtractor 40 only when the exponent of its floating point input has a value less than 000110. The exponent represents a number between −64 and 63 (7-bit binary number). 0000111 is always subtracted from the exponent.

Adder 30 and subtractor 40, shown in FIG. 1, are designed as a unidirectional feedback type model using the neural network concept. Subtractor 40 is a 7-bit subtractor formed by connecting two 2-bit subtractors and a 3-bit subtractor. A 7-bit subtractor designed using two 2-bit subtractors and a 3-bit subtractor can process information more rapidly than a general digital circuit due to rapid calculation of a borrow. Detailed descriptions of adder 30 and subtractor 40 are in the paper "The Implementation of An Adder and A Subtractor Using Neural Network", by Honglack Kim, the 1st Korea and Japan Joint Seminar, pp. 151-165, August, 1989. Detailed descriptions of adder and subtractor circuits for use with the presently preferred embodiment are shown in FIGS. 5A to 5D and 6A to 6B, respectively.

Figure 2:
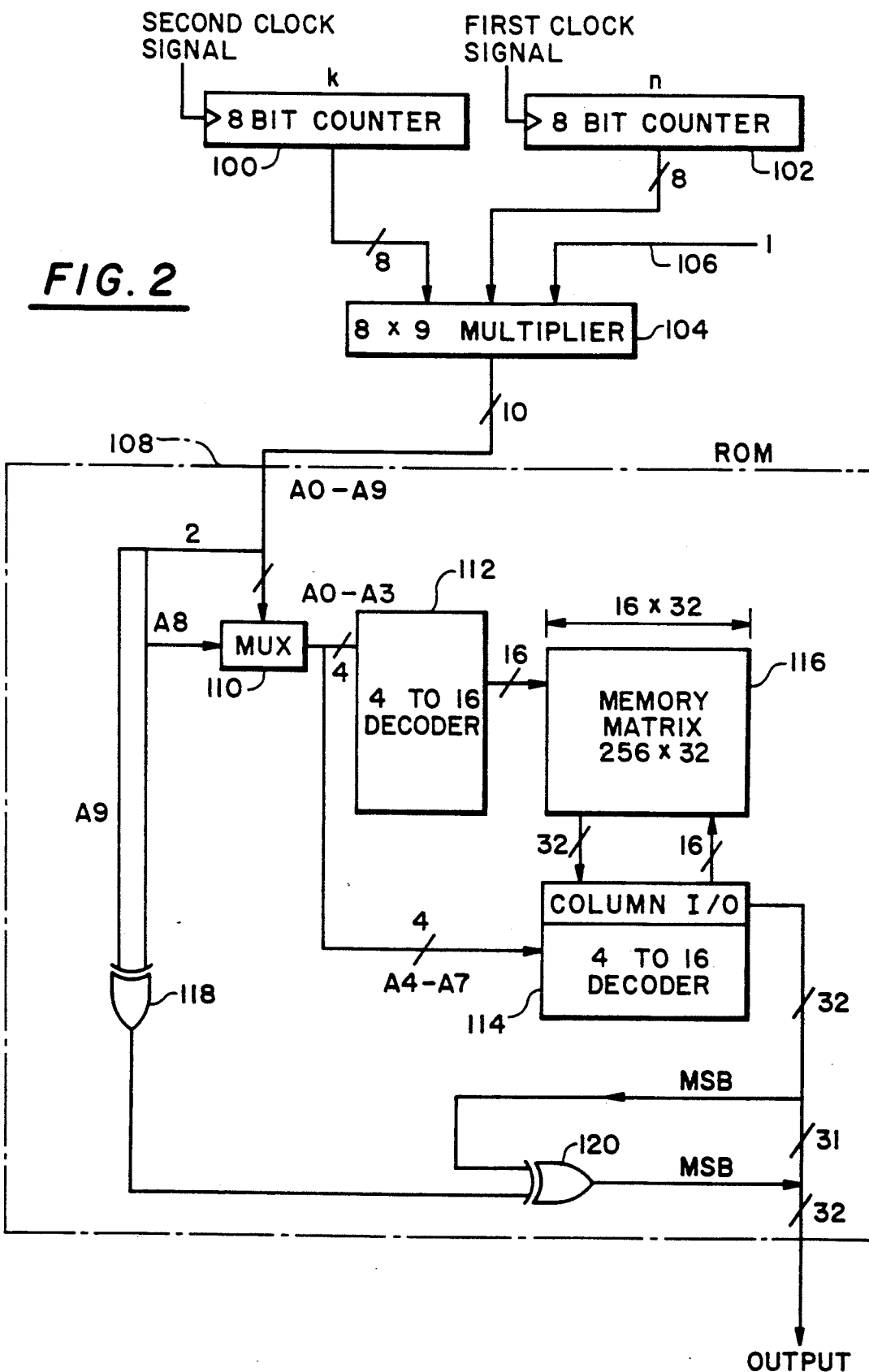
FIG. 2 shows a block diagram of the cosine term processing portion of FIG. 1.

FIG. 2 is a block diagram of a cosine term processing portion of FIG. 1. As shown in FIG. 2, there are two 8-bit counters 100 and 102 which respectively count values n and k in order to calculate values of (2n+1)k in equation (2). The values of (2n+1)k are calculated in a 8×9 multiplier 104, whose input consists of outputs from 8-bit counters 100 and 102 and a signal from one-bit-affixed terminal 106. The k value is directly input from 8-bit counter 100. The −2n+1 value, however, is input after shifting the 8-bit value of n, which is outputted by 8-bit counter 102, by 1 bit to the left and adding 1 to the least significant bit (LSB) set by one-bit-affixed terminal 106. The 8×9 multiplier 104 is composed of a combination of an AND gate and an 1's counter each of which comprises neural network circuits.

ROM 108 stores 32-bit floating point numbers for calculating $\cos[(2n+1)k\pi/512]$ in equation (2). In calculating $\cos[(2n+1)k\pi/512]$, the (2n+1)k term can be represented by one of the integers, 0, 1, ..., 1023. This can be inferred as follows. Let (2n+1)k be represented by a number l+m where it is assumed that l represents any integer and that m is equal to one of integers 0, 1, ..., 1023. This leads to $$\cos[(1024l+m)\pi/512]=\cos(2\pi+m\pi/512)=\cos(m\pi/512) \qquad (3).$$

As shown in equation (3), the cosine term is dependent only on m, and has a period of 1024 with respect to m. Furthermore, since there need be only 1024 possible values for the cosine term, a value of the cosine term, stored in ROM 108, can be selected by the lower ten-bits at the output of 8×9 multiplier 104. It follows that the size of ROM 108 can be reduced to 256×32-bits because, if properties of symmetry are considered, there are 512 possible values for equation (3) and only 256 values if the sign of the cosine term is ignored.

ROM 108 comprises:
a multiplexer 110 which receives eight input signals, A0 to A7;
two 4-to-16 decoders 112 and 114, designed using neural network concepts, each of which decode each of two groups of four signals, A0 to A3 and A4 to A7, from multiplexer 110 into sixteen signals;
a memory matrix 116 which memorizes the decoded signal from decoders 112 and 114; and
two EXCLUSIVE-OR (EX-OR) gates 118 and 120 for searching the sign of the cosine value by receiving the input signals, A8 and A9.

The 4-to-16 decoders 112 and 114 are composed of what may be called a single-layer perception model of a neural network. It is noted that the memory access time of a neural network 4-to-16 decoder is short due to its parallel processing capability. A full description of the 4-to-16 decoders in the present invention is provided in the Korean Patent Application No. 90-4172, titled "Decoder Circuit," filed on March 28, 1990 by the Applicant of the present invention. The corresponding U.S. patent application, Ser. No. 07/573,408 was filed on Aug. 28, 1990. The description of the 4-to-16 decoder provided in the aforementioned documents are incorporated herein by reference.

As shown in FIG. 2, the output of 8×9 multiplier 104, A0 to A7, addresses a number stored in ROM 108. Signals A8 and A9 are used to derive a sign bit for output of ROM 108, so that the memory size of ROM 108 need only be 256×32-bits. The value of the sign bit can be determined from values of the signals A8 and A9 as explained below.

When the value of A8 is 1, ROM 108 outputs a cosine of a number in one of two intervals on a real number line, either an interval from $\pi/2$ to x or an interval from $3/2\pi$ to $2\pi$; otherwise ROM 108 outputs a cosine of a number in one of two intervals spanning 0 to $\pi/2$ and $\pi$ to $3\pi/2$. The A9 bit serves a purpose similar to that of the A8 bit. When the value of A9 is 1, ROM 108 outputs a value of a cosine of a number in an interval from 0 to π; otherwise ROM 108 outputs a cosine of a number in an interval spanning π to 2π.

A cosine function, if graphed on a coordinate X-Y plane, has a symmetrical shape about the Y axis, i.e., the shape of an even function. This allows the output of multiplexer 110 to be dependent on A8 and A9. In addition, the value of the most significant bit (MSB) at the output of ROM 108 in FIG. 2 is set depending on the value of a signal from EX-OR gate 120, whose output of '1' indicates that the value of the cosine of a number is in an interval, π/2 to 3π/2. Thus, by using signals A8 and A9, the value of the sign bit output from ROM 108 can be properly assigned, and the memory size of ROM 108 can be reduced to 256×32-bits.

Figure 3:
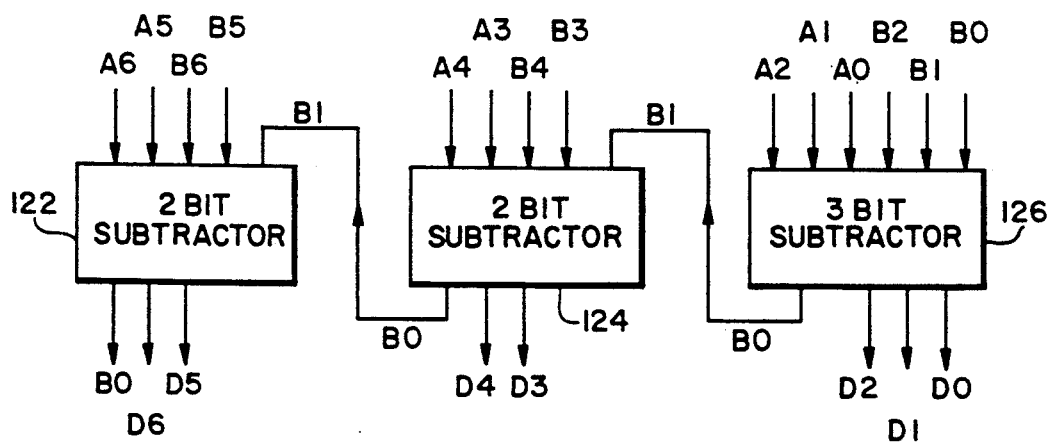
FIG. 3 shows a diagram of the 7-bit subtractor of FIG. 1.

FIG. 3 is a block diagram of −7-bit subtractor 40 of FIG. 1. 7-bit subtractor 40 is composed of two 2-bit subtractors 122 and 124 and a 3-bit subtractor 126 all connected in series, where each subtractor is designed using the neural network concept. A basic circuit of the subtractor is designed by using an unidirectional feedback type neural network model.

Figure 4:
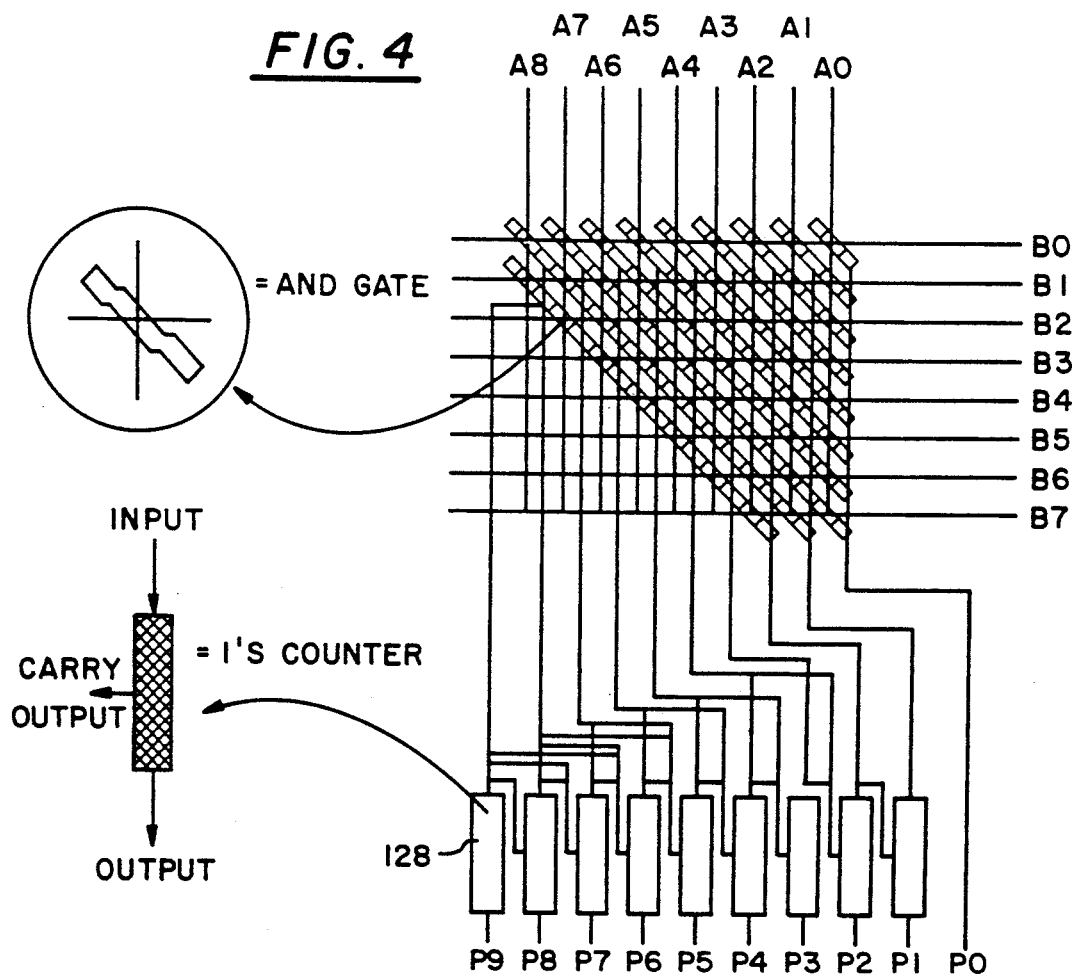
FIG. 4 shows a block diagram of an 8×9 multiplier using the 1's counter of FIG. 2.

FIG. 4 is a block diagram of an 8×9 multiplier 104 in FIG. 1 and a 1's counter 128 of a unidirectional feedback type model. Descriptions of 8×9 multiplier 104 and 1's counter 128 are given in Korean Application, No. 89-1368, filed on Feb. 2, 1989. The corresponding United States patent application, Ser. No. 07/473,633, was filed on Feb. 1, 1990. The descriptions provided in the aforementioned documents are incorporated herein by reference.

As described above, conventional digital logic circuits as well as neural network circuits are used in the discrete cosine transform chip of the present invention.

Examples of conventional digital logic circuits used in the discrete cosine transform chip include 32-bit latch port 60 having a reset terminal, 8-bit counters 100 and 102, and multiplexer 110, etc. Examples of circuits using neural network concepts in the discrete cosine transform chip of the present invention include adder 30, subtractor 40, decoders 112 and 114, 1's counter 128 and multiplier 104.

Figure 5A:
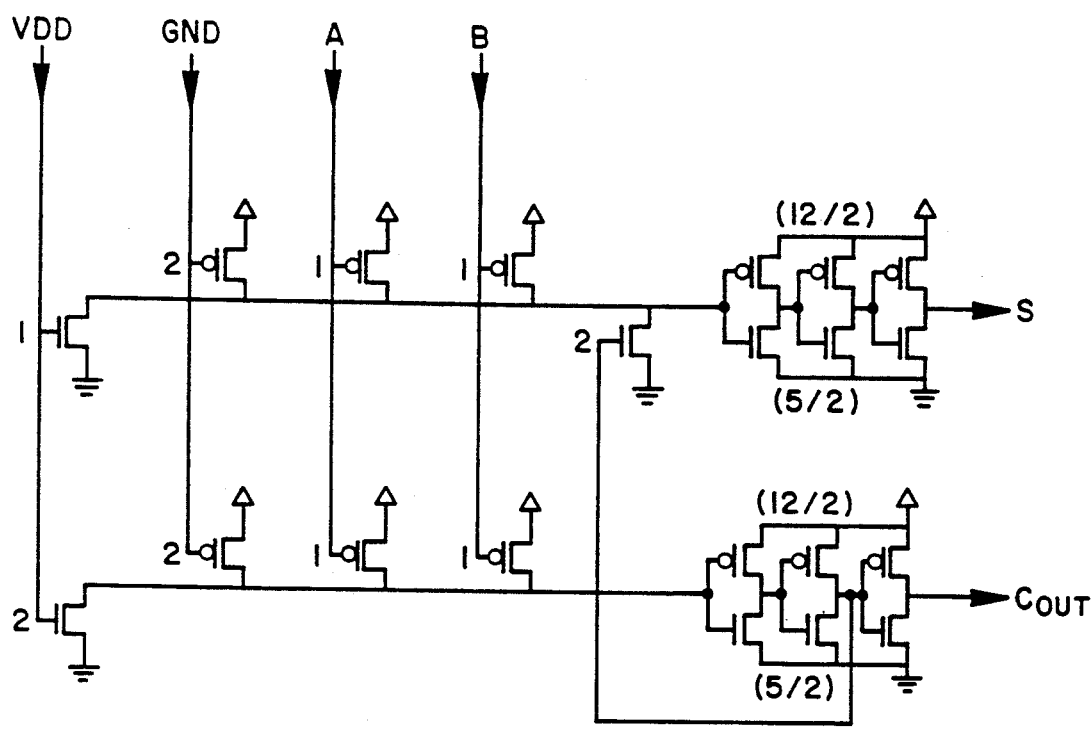
FIGS. 5A to 5D show detailed circuit diagrams of various adder circuits for use with the presently preferred embodiment.
Figure 5B:
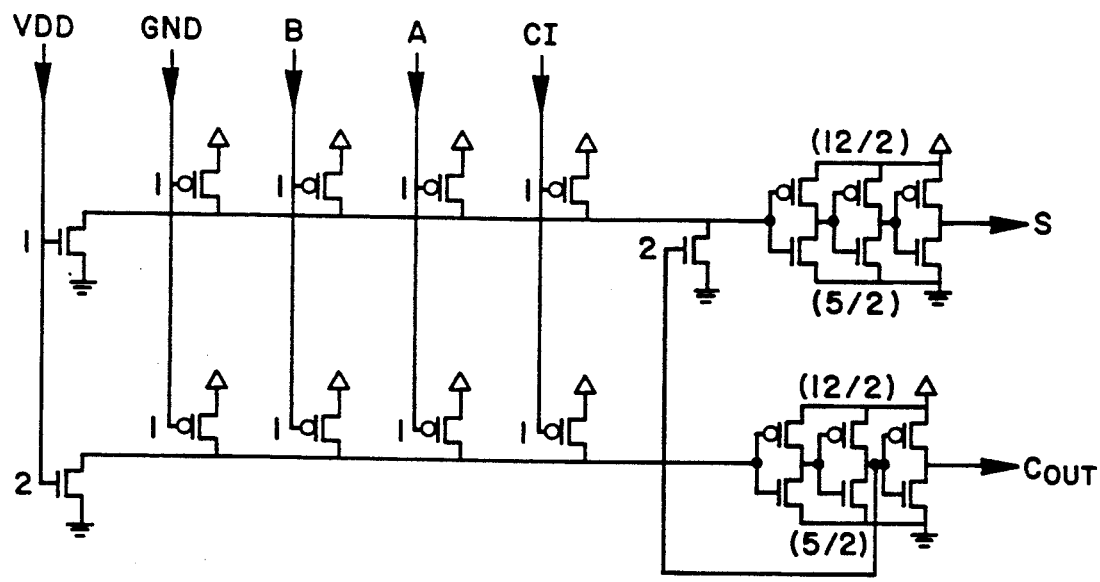
Figure 5C:
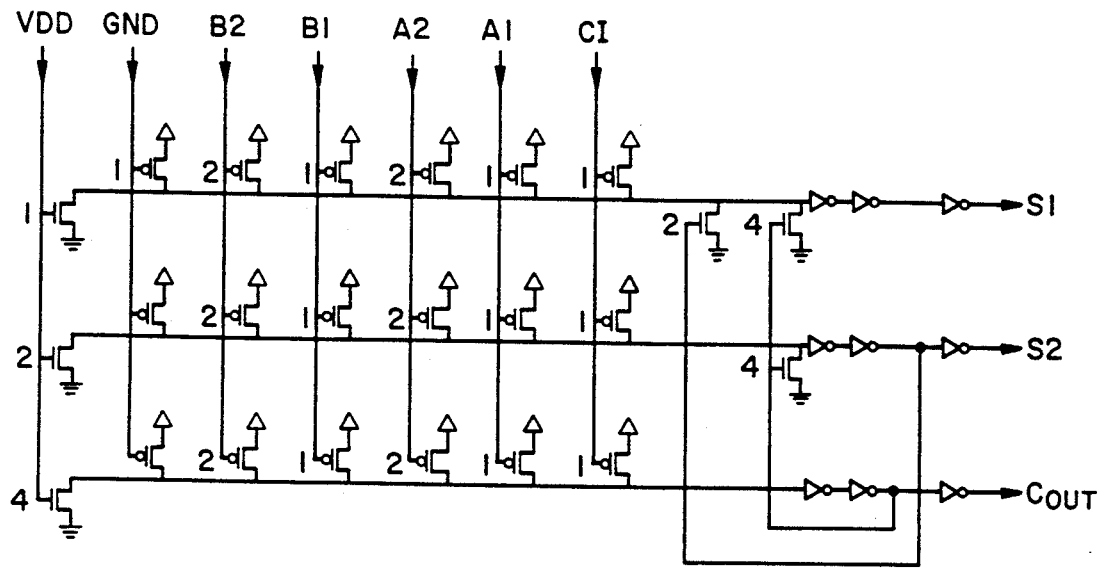
Figure 5D:
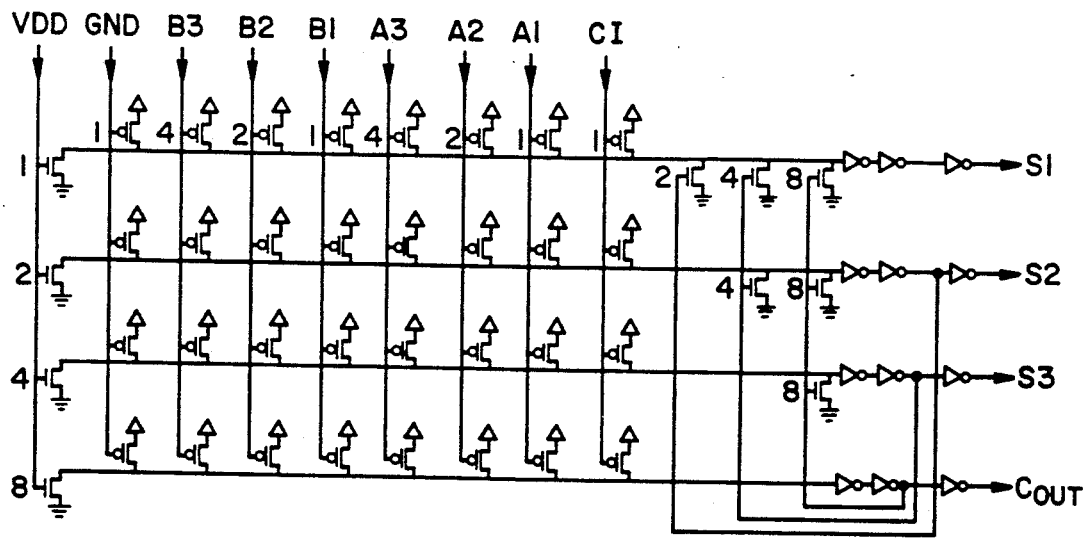

Of many neural network models, a single layer perception model is used in decoders 112 and 114 in FIG. 2 for designating an address of ROM 108 in order to calculate cosine terms, and an unidirectional feedback type model is used in adder 30, subtractor 40 and 1's counter 128 for internal data processing. FIGS. 5A–5D illustrate adder circuits designed based on neural network principles. Since the configuration principles of the four adder circuits are the same besides the number of I/O ports and their number of devices, only a full adder which is the basic circuit will be described. As shown in FIG. 5B, the full adder is a three-input/two-output circuit, and is formed of an inputting portion, an outputting portion, and a feedback portion which sends the output back to the preceding stage.

The MOS parameter W/L (width-to-length) value at a synapse is designed such that a PMOS is 5/2 and an NMOS is 2/2, and the conductance value is set to one when these W/L values have the above-mentioned values. The W/L value at a neuron is designed such that a PMOS is 12/2 and an NMOS is 5/2. In the drawing, the constants designated to each MOS are their conductance values.

The two stages at the left constitute a reference potential section, wherein the gate of the NMOS transistors are connected to VDD, and the gates of the PMOS transistors are connected to GND to keep the MOS transistors turned on. Also, the full adder, 2-bit adder, and 3-bit adder are designed to set the conductance to one when the value is 5/2 for a PMOS transistor, and 2/2 for an NMOS transistor. At the neuron, a buffer is employed to set the threshold the value form the synapse, and an inverter is added to obtain proper output.

Since the basic operating principle of the above-mentioned four adders is the same, just the full adder and 3-bit adder will be described as examples. To begin with, it should be noted that the conductance values are set to one, respectively, when the W/L value of a PMOS transistor is 5/2 and the W/L value of an NMOS transistor is 2/2. Thus, when the ratios of the W/L values of the PMOS and NMOS transistors (hereinafter referred to as "weight value") are the same, the output value becomes less than 2.5 volts.

First, since the PMOS transistors are connected parallel to one another, when zero volts is applied to three input stages, the weight values of the synapse at the lower stage become such that the weight sum of the PMOS transistors is four, and that of the NMOS transistors is two. Therefore, the voltage at the preceding stage of an output buffer is slightly higher than 2.5 volts, and ultimately, zero volts is output by being inverted through an inverter after passing through the buffer. Also, a voltage feedback through the buffer maintains its logic high state, thereby turning on the feedback NMOS transistor of the LSB stage synapse. Accordingly, the total ratio of the weights of the LSB stage is such that the weight ratio of the PMOS transistors is four, and that of the NMOS transistors is three, so that the voltage at the preceding stage of the buffer becomes high. The voltage passes through the inverter, and then zero volts is output, thereby obtaining the proper value of the full adder.

Moreover, when 0 V, 5 V, and 5 V are respectively applied to input terminals, the total weight ratio between the PMOS and NMOS transistors at the MSB stage synapse becomes 1:2, and the voltage preceding the buffer also becomes low (<2.5 V), so that the feedback NMOS transistor is turned off, and the output of the MSB stage is maintained high via the inverter. Also, the total weight ratio of the PMOS and NMOS transistors of the LSB stage synapse becomes 2:1, so that the voltage value input to the buffer becomes high (>2.5 V) since the weight value of the PMOS transistor is higher than that of the NMOS transistor as described above. Therefore, the value become slow via the inverter. Similarly, when 5 V, 0 V, and 0 V are applied to the input terminals, 0 V is output from the MSB stage and 5 V is output from the LSB stage by the same steps as above. If the values of any case are input, it can be confirmed that this circuit is a full adder.

In the 3-bit adder, the W/L values of MOS transistors are adjusted, so that the weight values to bits of input portions are designed to be 1, 2, and 4, respectively. Also, the W/L values of the GND synapse are designed such that the S1 stage is 4/2, the S2 stage is 2/2, the S3 stage is 2/2, and the Cout stage is 2/4. These values are obtained by the result of circuit simulation.

The operation of the half-adder circuit is determined by the difference between the weight values of the PMOS and NMOS transistors. The full adder and 2-bit adder are operated on the same basis.

The circuit configurations of 2-bit and 3-bit subtractors are the same as those of 2-bit and 3-bit adders except that an inverter is connected to one input of each adder, and a borrow-in input is used instead of a carry-in input.

Figure 6A:
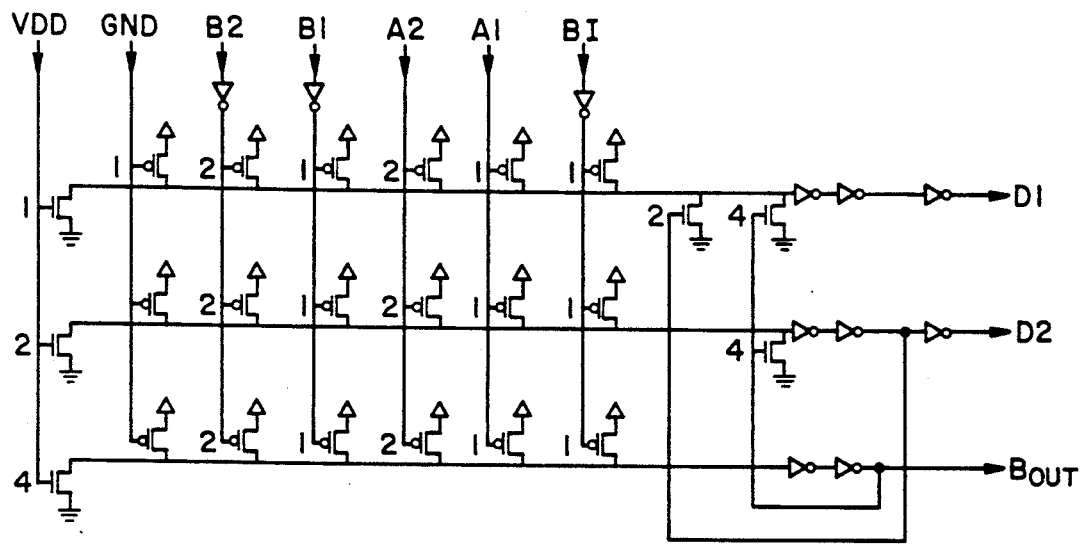
FIGS. 6A and 6B show detailed circuit diagrams of 2-bit and 3-bit subtractor circuits, respectively, for use with the presently preferred embodiment.

FIG. 6A is a circuit diagram of a 2-bit subtractor. Minuends A2 and A1, subtrahends B2 and B1, and a terminal BI for inputting a borrow from lower ciphers are the inputs indicated on the upper portion of the circuit, while the D2, and D1 terminals, and the Bout terminal for outputting a borrow exceeding a succeeding stage, are the outputs provided at the right of the circuit.

Figure 6B:
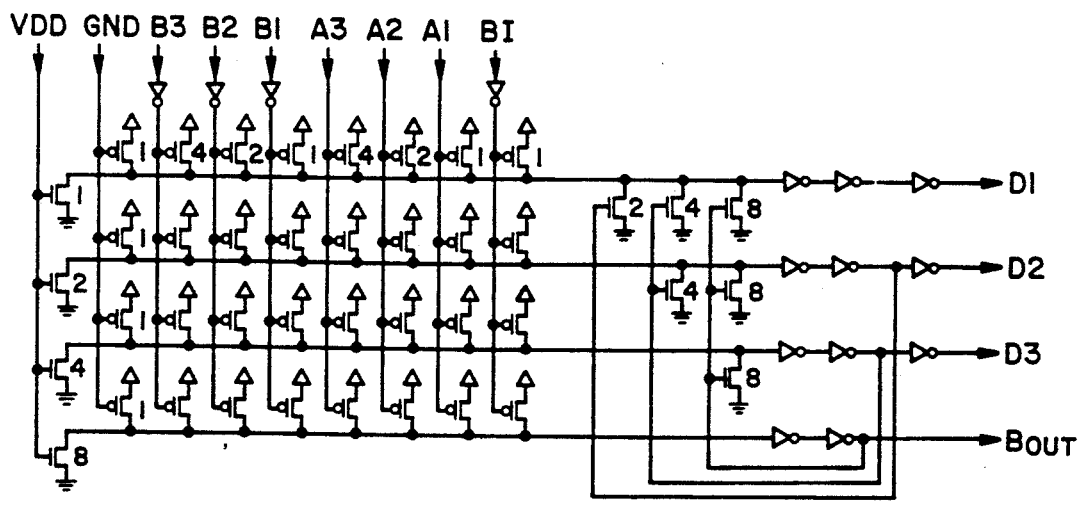

The subtrahends B2 and B1 are inverted after being passed through an inverter at the synapse. The weight values of the PMOS transistors at the synapse is illustrated in FIGS. 6A and 6B. Each neuron stage is formed as a buffer. FIG. 6B shows a 3-bit subtractor which is identical to the 2-bit subtractor, except that its input additionally has B2 and A2 terminals, and whose weight value of a PMOS transistor is four, as well as an NMOS transistor whose weight value is eight and connected to VDD, and an NMOS transistor whose weight value is eight and feedback from Bout.

By adopting the adder circuitry without changes, the subtractor has been designed by the relation of $A-B = A+B'+1$.

Accordingly, in describing the operating principle of the adder, when the total weight ratios of the W/L values of the above-stated PMOS and NMOS transistors are the same, the voltage input to the buffer stage is less than 2.5 volts. The relation between the input and output of the 2-bit and 3-bit subtractors can be expressed as follows:

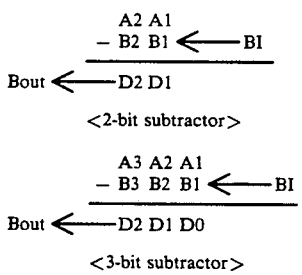

The operation will be described referring to the above relationships and the circuit diagrams of FIGS. 6A and 6B. To begin with, assuming that B2, B1, and BI do not exist in the 2-bit subtractor, it can be noted that the respective values of A2 and A1 are output unchanged, through outputs D2 and D1. Also, when each of the values of B2, B1, and BI equal one, the PMOS transistor is operated to heighten the voltage of the synapse. As a result, a substraction effect can be obtained.

The case where B>A will be considered first.

When the A2A1 value is 01 and the B2B1 value is 10, and then BI is 0, the turned on portion of the synapse is VDD, GND, B2, and A2 columns. Since the weight ratio of the PMOS and NMOS transistors at the Bout stage is 5:4, the output value of B0 becomes 1, and the feedback NMOS is turned on;. Thereafter, since the weight ratio of the D2 stage is 5:6, the NMOS side is predominant, the output value of D2 becomes one. Also, the value feedback through the buffer is low (<2.5), so that the NMOS transistor is not operated. In the D1 stage, since the weight ratio is 5:5, the inverted value through the buffer becomes one. Thus, the outputs of respective stages become 1, 1, and 1 (Bout, D2 and D1), and a proper result can be obtained.

Next, the case where A>B will be considered.

When the A2A1 value is and the B2B1 value is 01, and then BI is 0, the transistors connected to the VDD, GND, A1, and B1 columns are turned on. At this time, when the weight ratio of the B0 stage becomes 3:4, which makes Bout zero, and the feedback NMOS transistor is turned off. The weight ratio of the D2 stage becomes 3:2, so that the output value of the D2 stage is zero, as well as the feedback NMOS having a weight value of two is turned on. The weight ratio of the D1 stage becomes 3:3, so that the output value inverted after having passed through the buffer, is one. Therefore, the proper result can be obtained by the output values such that Bout is "zero," D2 is "zero," and D1 is "one".

The operating principle is also the same in the 3-bit subtractor.

A preferred embodiment of the present invention has been described and illustrated for a 256-point discrete cosine transform. However, application of the present invention need not be limited to the above-described embodiment, and can include devices and processes within the scope of the following claims.

What is claimed is:

1. An N-point discrete cosines transform integrated circuit, including input and output terminals, for calculating values of a discrete cosine transform function which is expressed as $$F(k) = \frac{2c(k)}{N} \sum_{n=0}^{N-1} f(n) \cos((2n+1)kn/2N)$$

where $c(k)=2-\frac{1}{2}$ for $k=0$, $c(k)=1$ for $k=1, 2, \ldots, N-1$, and f(n) represents input values externally provided via said input terminal, the discrete cosine transform integrated circuit comprising:

a cosine term processing portion for processing a cosine term included in said discrete cosine transform function to generate an output value in response thereto;

means for multiplying an input f(n) value and the output value from said cosine term processing portion;

first latch means for storing a result signal input thereto in response to a first clock signal, said first latch means being reset in response to a second clock signal;

means for adding a multiplied output from said multiplying means and a result signal previously stored in said first latch means, and storing the addition result into the first latch means replacing any previously stored result signal;

means for subtracting a predetermined binary value from the result signal currently stored in said first latch means to generate a second output value which represents that currently stored result signal divided by N/2; and second latch means connected to said subtracting means and said discrete cosine transform integrated circuit output terminals, said second latch means being reset when an underflow condition is generated by said subtracting means, said second latch means also latching the output second value and storing the result signal outputted from said first latch means and said subtracting means in response to the second clock signal.

2. A discrete cosine transform chip as in claim 1, wherein said cosine term processing portion comprises:

a one-bit-affixed terminal having a single signal value;

two 8-bit counters which respectively count values of n and k in order to calculate the value of the (2n+1)k term within the cosine term;

an 8×9 neural network multiplier having an input comprises of outputs of said two 8-bit counters and said single one-bit-affixed terminal; and a discrete cosine read-only-memory (ROM) from which there is read values of cosines in accordance with outputs form said 8×9 neural network multiplier.

3. A discrete cosine transform chip as in claim 2, wherein said discrete cosine ROM comprises:

multiplexer means for receiving eight input signals;

two 4-to-16 neural network decoders, each for decoding one of two groups of four signals form said multiplexer means into a group of sixteen decoded signals, respectively;

two exclusive-OR gates for determining the signal of a cosine of a umber in accordance with two output values form said 8×9 neural network multiplier;

a memory matrix for outputting stored numbers, each of which is addressable by the decoded signals form said decoders; and outputting means for producing a cosine of a number in accordance with outputs from said two exclusive-OR gates and said memory matrix.

4. A discrete cosine transform chip as in claim 3, wherein the discrete cosine transform chip is used to compute a 256-point discrete cosine transform.

5. A discrete cosine transform chip as in claim 2, wherein the discrete cosine transform chip is used to compute a 256-point discrete cosine transform.

6. A distance cosine transform chip as in claim 1, said multiplying means including an 8×9 neural network multiplier comprising a unidirectional feedback type model circuit and a 32-bit floating point multiplier composed of 1's counters.

7. A discrete cosine transform chip as in claim 6, wherein the discrete cosine transform chip is used to compute a 256-point discrete cosine transform.

8. A discrete cosine transform chip as in claim 1, said adding means including a 32-bit floating point adder comprising a unidirectional feedback type model circuit.

9. A discrete cosine transform chip as in claim 8, wherein the discrete cosine transform chip is used to compute a 256-point discrete cosine transform.

10. A discrete cosine transform chip as in claim 1, said subtracting means comprising two 2-bit subtractors and a 3-bit subtractor all of which are connected in series and each of which comprises a unidirectional feedback type model circuit.

11. A discrete cosine transform chip as in claim 10, wherein the discrete cosine transform chip is used to compute a 256-point discrete cosine transform.

12. A discrete cosine transform chip as in claim 1, wherein the discrete cosine transform chip is used to compute a 256-point discrete cosine transform.

* * * * *